United States Patent
Luo et al.

(10) Patent No.: US 9,743,063 B2
(45) Date of Patent: Aug. 22, 2017

(54) METHOD AND APPARATUS FOR PROCESSING THREE-DIMENSIONAL (3D) PSEUDOSCOPIC IMAGES

(71) Applicant: SuperD Co. Ltd., Shenzhen (CN)

(72) Inventors: Yanqing Luo, Shenzhen (CN); Peiyun Jian, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 28 days.

(21) Appl. No.: 15/004,514

(22) Filed: Jan. 22, 2016

(65) Prior Publication Data

US 2016/0219259 A1 Jul. 28, 2016

(30) Foreign Application Priority Data

Jan. 22, 2015 (CN) .......................... 2015 1 0033241

(51) Int. Cl.
*H04N 13/00* (2006.01)
*G06T 7/00* (2017.01)

(52) U.S. Cl.
CPC ....... *H04N 13/0018* (2013.01); *G06T 7/0002* (2013.01); *G06T 2207/10021* (2013.01); *G06T 2207/30168* (2013.01); *H04N 2013/0074* (2013.01)

(58) Field of Classification Search
CPC ........ H04N 13/0018; H04N 2013/0074; G06T 2207/10012; G06T 15/00; G06T 2207/30168; G06T 7/0002; G06T 2207/10021; G06K 2209/40
See application file for complete search history.

(56) References Cited

U.S. PATENT DOCUMENTS

| | | |
|---|---|---|
| 7,095,539 B2 | 8/2006 | Kremen |
| 2012/0154394 A1* | 6/2012 | Horikoshi .............. G09G 3/003 345/419 |

(Continued)

FOREIGN PATENT DOCUMENTS

| | | |
|---|---|---|
| CN | 102395037 A | 3/2012 |
| CN | 103209336 A | 7/2013 |

(Continued)

OTHER PUBLICATIONS

Jaeho Lee, Chanho Jung, Changick Kim, and Amir Said; "Content-Based Pseudoscopic View Detection"; Springer (2011).*

*Primary Examiner* — Stephen R Koziol
*Assistant Examiner* — Shaghayegh Azima
(74) *Attorney, Agent, or Firm* — Anova Law Group, PLLC (57) ABSTRACT

A method for detecting three-dimensional (3D) pseudoscopic images and a display device for detecting 3D pseudoscopic images are provided. The method includes extracting corresponding feature points in a first view and corresponding feature points in a second view, wherein the first view and the second view form a current 3D image; calculating an average coordinate value of the feature points in the first view and an average coordinate value of the feature points in the second view; based on the average coordinate value of the feature points in the first view and the average coordinate value of the feature points in the second view, determining whether the current 3D image is pseudoscopic or not; and processing the current 3D image when it is determined that the current 3D image is pseudoscopic.

16 Claims, 6 Drawing Sheets

(56) References Cited

U.S. PATENT DOCUMENTS

| | | | | |
|---|---|---|---|---|
| 2012/0206445 A1* | 8/2012 | Chiba | ................ | H04N 13/0413 345/419 |
| 2013/0044101 A1* | 2/2013 | Kim | ...................... | H04N 17/04 345/419 |
| 2014/0035907 A1* | 2/2014 | Hasegawa | ................ | G09G 5/14 345/419 |
| 2015/0092030 A1* | 4/2015 | Lee | .................... | G02B 27/2214 348/59 |

FOREIGN PATENT DOCUMENTS

| | | | |
|---|---|---|---|
| CN | 103369333 | A | 10/2013 |
| CN | 103503448 | A | 1/2014 |
| JP | 2000003446 | A | 1/2000 |
| JP | 2012053165 | A | 3/2012 |
| JP | 2013181738 | A | 9/2013 |
| WO | 2013108310 | A1 | 7/2013 |

* cited by examiner

METHOD AND APPARATUS FOR PROCESSING THREE-DIMENSIONAL (3D) PSEUDOSCOPIC IMAGES

CROSS-REFERENCES TO RELATED APPLICATIONS

This application claims priority of Chinese Application No. 201510033241.0, filed on Jan. 22, 2015, the entire contents of which are hereby incorporated by reference.

FIELD OF THE INVENTION

The present disclosure generally relates to the field of three-dimensional (3D) display technologies and, more particularly, relates to a method for detecting 3D pseudoscopic images and a display device thereof.

BACKGROUND

For a smartphone or a digital camera capable of capturing three-dimensional (3D) images, it usually takes two images of a same scene, in which the two images have a correct relative order and a parallax between them, and then arranges the two images into a 3D image. In addition, a user may upload two-dimensional (2D) images and utilize a 3D image creating software to generate corresponding 3D images of the uploaded 2D images. The user may further generate a 3D video based on multiple 3D video frames (i.e. 3D images), which can be played back on a 3D video player.

However, the user may not notice the relative order between the two images forming the 3D image or 3D video frame, for example, a left eye view and a right eye view, and thus may arrange the two images in an incorrect order, resulting an incorrect 3D image. For example, the user's left eye may see the right eye view and the user's right eye may see the left eye view, causing 3D image depth to be reversed to the user. That is, a pseudoscopic image or a pseudoscopic view may be generated and the viewing experience may be affected.

According to the present disclosure, detection and correction of the pseudoscopic image is of significant importance. If the pseudoscopic image cannot be detected and corrected, the user experience will be significantly degraded. To detect whether there is a pseudoscopy between a left view and a right view may often need to utilize corners respectively detected in the left view and the right view.

The disclosed methods and systems are directed to solve one or more problems set forth above and other problems.

BRIEF SUMMARY OF THE DISCLOSURE

One aspect of the present disclosure includes a method for detecting three-dimensional (3D) pseudoscopic images. The method includes extracting corresponding feature points in a first view and corresponding feature points in a second view, wherein the first view and the second view form a current 3D image; calculating an average coordinate value of the feature points in the first view and an average coordinate value of the feature points in the second view; based on the average coordinate value of the feature points in the first view and the average coordinate value of the feature points in the second view, determining whether the current 3D image is pseudoscopic or not; and processing the current 3D image when it is determined that the current 3D image is pseudoscopic.

Another aspect of the present disclosure includes a display device for detecting 3D pseudoscopic images. The display device includes a feature extraction module configured to extract corresponding feature points in a first view and corresponding feature points in a second view, wherein the first view and the second view form a current 3D image, an average value calculation module configured to calculate an average coordinate value of the feature points in the first view and an average coordinate value of the feature points in the second view, and a decision module configured to determine whether the current 3D image is pseudoscopic or not based on the average coordinate value of the feature points in the first view and the average coordinates values of the feature points in the second view.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention.

3D display device is usually based a parallax principle, in which a left view for a left eye and a right view for a right eye are separated by a lens or a grating and then received by the user's left eye and right eye, respectively. The user's brain fuses the left view and the right view to generate a correct visual perception of 3D display, i.e., a 3D image with a correct depth perception.

However, it is possible that the left eye receives the right view while the right eye receives the left view, for example, two images with an incorrect relative order are arranged into a 3D image, or two images with an incorrect relative position are synthesized into a 3D image, etc. In such cases, the user may experience a pseudoscopic (reversed stereo/3D) image showing an incorrect depth perception. For example, a box on a floor may appear as a box shaped hole in the floor. Thus the viewing experience may be greatly degraded.

Figure 7:
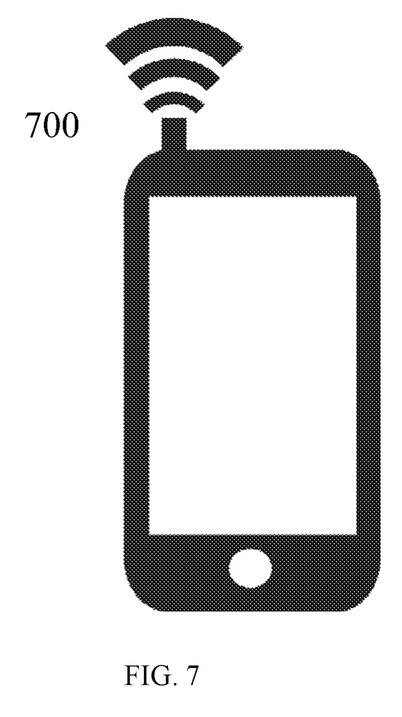
FIG. 7 illustrates an exemplary display device consistent with disclosed embodiments.

The present disclosure provides a method for detecting 3D pseudoscopic images, which may be implemented into a display device. FIG. 7 illustrates an exemplary display device consistent with disclosed embodiments. The display device 700 may be an electronic device which is capable of capturing 3D images, such as a smartphone, a tablet, and a digital camera, etc., or an electronic device which is capable of playing and/or generating 3D images such as a notebook, a TV, and a smartwatch, etc. Although the display device 700 is shown as a smartphone, any device with computing power may be used.

Figure 5:
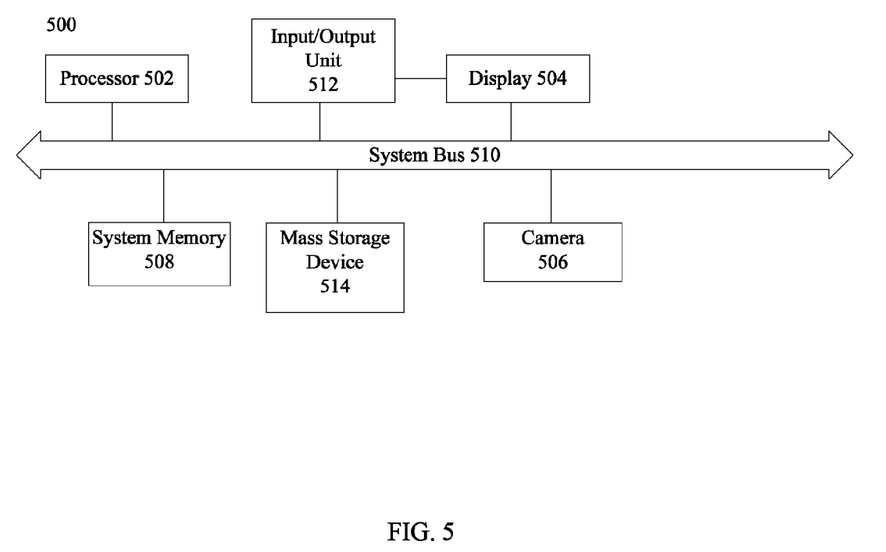
FIG. 5 illustrates a block diagram of an exemplary display device consistent with disclosed embodiments.

FIG. 5 illustrates a block diagram of an exemplary display device consistent with disclosed embodiments. As shown in FIG. 5, the display device 500 may include a processor 502, a display 504, a camera 506, a system memory 508, a system bus 510, an input/output module 512, and a mass storage device 514. Other components may be added and certain devices may be removed without departing from the principles of the disclosed embodiments.

The processor 502 may include any appropriate type of central processing module (CPU), graphic processing module (GPU), general purpose microprocessor, digital signal processor (DSP) or microcontroller, and application specific integrated circuit (ASIC). The processor 502 may execute sequences of computer program instructions to perform various processes associated with the display device.

The display 504 may be any appropriate type of display, such as plasma display panel (PDP) display, field emission display (FED), cathode ray tube (CRT) display, liquid crystal display (LCD), organic light emitting diode (OLED) display, light emitting diode (LED) display, or other types of displays.

The camera 506 may be an internal camera in the display device 500 or may be an external camera connected to the display device 500 over a network. The camera 506 may provide images and videos to the display device.

The system memory 508 is just a general term that may include read-only memory (ROM), random access memory (RAM) and etc. The ROM may store necessary software for a system, such as system software. The RAM may store real-time data, such as images for displaying.

The system bus 510 may provide communication connections, such that the display device may be accessed remotely and/or communicate with other systems via various communication protocols, such as transmission control protocol/internet protocol (TCP/IP), hypertext transfer protocol (HTTP), etc.

The input/output module 512 may be provided for users to input information into the display device or for the users to receive information from the display device. For example, the input/output module 512 may include any appropriate input device, such as a remote control, a keyboard, a mouse, an electronic tablet, voice communication devices, or any other optical or wireless input devices.

Further, the mass storage device 514 may include any appropriate type of mass storage medium, such as a CD-ROM, a hard disk, an optical storage, a DVD drive, or other type of storage devices.

During an operating process, the processor 502, executing various software modules, may perform certain processes to display images or videos to one or more users.

Figure 1:
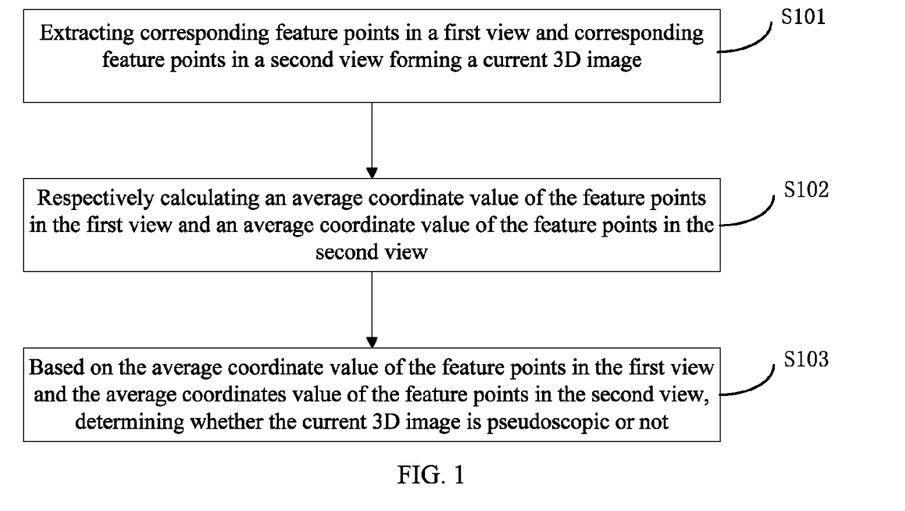
FIG. 1 illustrates a flow chart of an exemplary method for detecting 3D pseudoscopic images consistent with disclosed embodiments.

FIG. 1 illustrates a flow chart of an exemplary method for detecting 3D pseudoscopic images consistent with disclosed embodiments. As shown in FIG. 1, at the beginning, corresponding feature points in a first view and corresponding feature points in a second view are extracted respectively, in which the first view and the second view may form a current 3D image (S101).

In particular, the feature points in the first view and the feature points in the second view may also be called as interest points, significant points, key points, etc., which may exhibit a certain pattern in a local image, such as intersections of different objects, intersections of different regions with different colors, and points of discontinuity on a boundary of an object, etc.

A display device may extract feature points in the first view and the feature points in the second view based on Harris corner detection algorithm or SUSAN corner detection algorithm, etc. For example, the display device may extract feature parameters of the feature points in the first view and feature parameters of the feature points in the second view, the feature parameters may include a Speeded Up Robust Features (SURF), a Scale-invariant feature transform (SIFT) feature, a Binary Robust Invariant Scalable Keypoints (BRISK) feature, and a Binary Robust Independent Elementary Features (BRIEF), etc.

Based on the feature parameters of the first view and the feature parameters of the second view, the display device may match the feature points in the first view and the feature points in the second view, and then determine the corresponding feature points in the first view and feature points in the second view.

For example, the feature parameters of the first view and the feature parameters of the second view may be matched based on a K approaching algorithm. After being determined, the corresponding feature points in the first view and feature points in the second view may be defined. For example, the feature points may be disposed in an X-Y coordinate system, and given an X-axis coordinate value and a Y-axis coordinate value.

After extracting the corresponding feature points in the first view and the corresponding feature points in the second view, an average coordinate value of the feature points in the first view and an average coordinate value of the feature points in the second view are calculated, respectively (S102).

The average coordinate value may be an average of X-axis coordinate values of all the feature points in each view (i.e. the first view or the second view), or an average of Y-axis coordinate values of all the feature points in each view (i.e. the first view or the second view).

For example, in one embodiment, a left view and a right view may be adopted to form a current 3D image, the left view may be a first view and the right view may be a second view. An average coordinate value in the first view may be the sum of X-axis coordinate values of all feature points in the first view divided by the number of all the feature points in the first view. An average coordinate value in the second view may be the sum of X-axis coordinate values of all feature points in the second view divided by the number of all the feature points in the second view.

In one embodiment, an upper view and a lower view may be adopted to form a current 3D image, the upper view may be a first view and the lower view may be a second view. An average coordinate value in the first view may be the sum of Y-axis coordinate values of all feature points in the first view divided by the number of all the feature points in the first view. An average coordinate value in the second view may be the sum of Y-axis coordinate values of all feature points in the second view divided by the number of all the feature points in the second view.

Based on the average coordinate value of the feature points in the first view and the average coordinates value of the feature points in the second view, whether the current 3D image is pseudoscopic or not may be determined (S103).

In particular, in one embodiment, a left view and a right view may be used to form a current 3D image, and the left view may be a first view and the right view may be a second view. If an average coordinate value of feature points in the first view is larger than or equal to an average coordinate value of the feature points in the second view, the current 3D image may be determined to be pseudoscopic. On the contrary, if the average coordinate value of the feature points in the first view is smaller than the average coordinate value of the feature points in the second view, the current 3D image may be not pseudoscopic.

In another embodiment, a left view and a right view may be used to form a current 3D image, and the right view may be a first view and the left view may be a second view. If an average coordinate value of feature points in the second view is larger than or equal to an average coordinate value of feature points in the first view, the current 3D image may be determined to be pseudoscopic. On the contrary, if the average coordinate value of the feature points in the second view is smaller than the average coordinate value of the feature points in the first view, the current 3D image may not be pseudoscopic.

Further, if the current 3D image is determined to be pseudoscopic, the display device may be able to correct the pseudoscopic image through processing the first view and the second.

For example, in one embodiment, a left view and a right view may be used to form a current 3D image, and the left view may be a first view and the right view may be a second view. When the current 3D image is determined to be pseudoscopic, the display device may correct the pseudoscopic image through adjusting the relative order or the relative position of the first view and the second view. That is, the first view may become the right view while the second view may become the left view.

In another embodiment, a left view and a right view may be used to form the current 3D image, and the right view may be a first view and the left view may be a second view. When the current 3D image is determined to be pseudoscopic, the display device may correct the pseudoscopic image through adjusting the relative order or the relative position of the first view and the second view. That is, the first view may become the left view while the second view may become the right view.

In another embodiment, an upper view and a lower view may be adopted to form the current 3D image, the upper view may be a first view and the lower view may be a second view. The current 3D image is determined to be pseudoscopic. The display device may correct the current pseudoscopic image through adjusting the relative order or the relative position of the first view and the second view. That is, the first view may become the lower view while the second view may become the upper view.

In another embodiment, an upper view and a lower view may be adopted to form the current 3D image, the lower view may be a first view and the upper view may be a second view. The current 3D image is determined to be pseudoscopic. The display device may correct the current pseudoscopic image through adjusting the relative order or the relative position of the first view and the second view. That is, the first view may become the upper view while the second view may become the lower view.

Figure 2A:
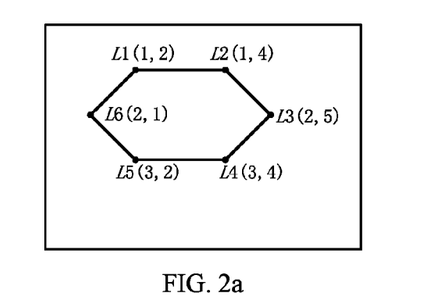
FIG. 2a and FIG. 2b illustrate exemplary feature points in an exemplary method for detecting 3D pseudoscopic images consistent with disclosed embodiments.

FIG. 2a and FIG. 2b illustrate exemplary feature points in an exemplary method for detecting 3D pseudoscopic views consistent with disclosed embodiments. As shown in FIG. 2a, corners (i.e. features points) are detected in a first view. Six corners may be detected and coordinate values of the six corners in an X-Y coordinate system are L1 (1,2), L2 (1,4), L3 (2,5), L4 (3,4), L5 (3,2), L6 (2,1), respectively.

Figure 2B:
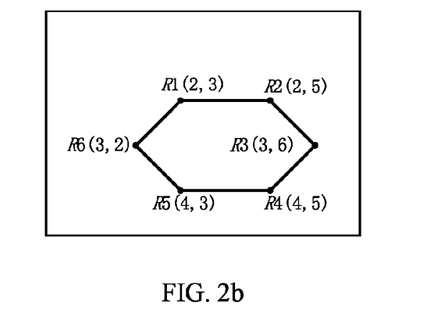

As shown in FIG. 2b, six corners may be detected in a second view and coordinate values of the six corners in the X-Y coordinate system are R1 (2,3), R2 (2,5), R3 (3,6), R4 (4,5), R5 (4,3), R6 (3,2), respectively. The six corners (i.e. feature points) in the first view may correspond to the six corners (i.e. feature points) in the second view. The first view and the second view may be adopted to form a current 3D image.

An average coordinate value in the first view may be the sum of X-axis coordinate values of all the feature points in the first view divided by the number of all the feature points in the first view. That is, $A=(2+4+5+4+2+1)/6=3$. An average coordinate value in the second view may be the sum of X-axis coordinate values of all the feature points in the second view divided by the number of all the feature points in the second view. That is, $B=(3+5+6+5+3+2)/6=4$.

Because the average coordinate value of the feature points in the first view is smaller than the average coordinate value of the corresponding feature points in the second view, the current 3D image may be not pseudoscopic, and a correction may not be required.

If the current 3D image is pseudoscopic, the pseudoscopic image may need to be corrected. In particular, the pseudoscopic image may be corrected through adjusting the relative order or relative position of the first view and the second view when generating the current 3D image or displaying the current 3D image. For example, if FIG. 2b shows a first view and FIG. 2a shows a second view, the relative order of the first view and the second view may be exchanged to correct the pseudoscopic image.

Further, a user may utilize a 3D video player implemented in a display device to play a 3D video. However, before playing the 3D video, detecting 3D pseudoscopic images (i.e. the pseudoscopic image detection) in the 3D video may be highly desired, in case the 3D video may include any pseudoscopic video frames (i.e., pseudoscopic images) which may affect the viewing experience. The display device may correct the pseudoscopic video frames as described above, and then play the corrected 3D video. Thus, 3D video frames may have to be selected before extracting the corresponding feature points in the first view and the corresponding feature points in the second view.

Figure 3:
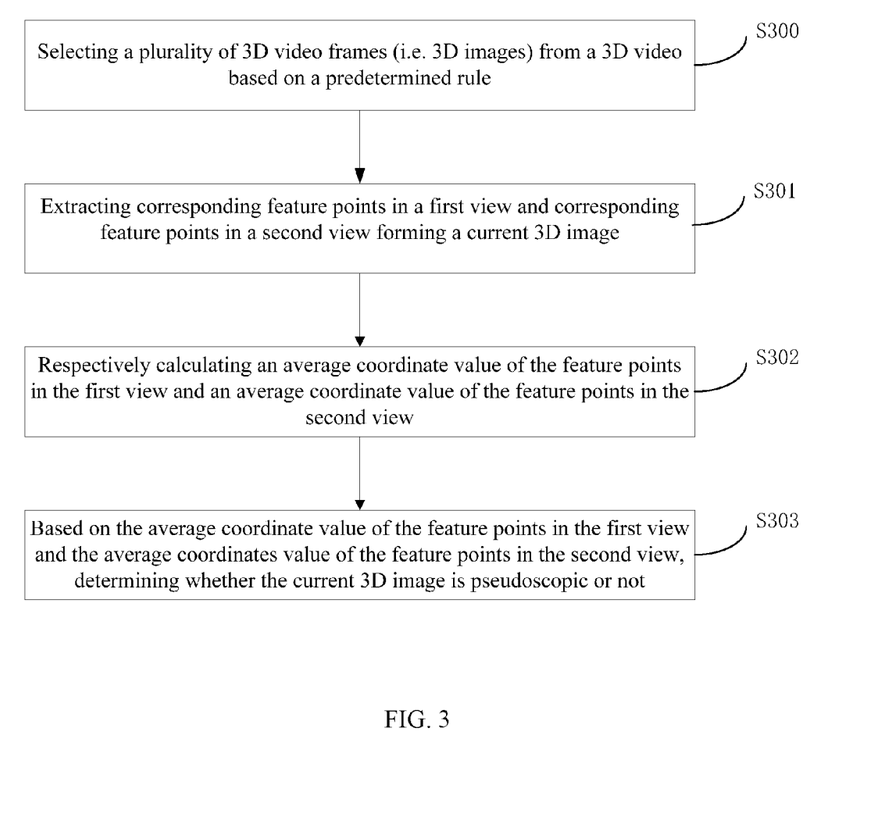
FIG. 3 illustrates a flow chart of another exemplary method for detecting 3D pseudoscopic images consistent with disclosed embodiments.

FIG. 3 illustrates a flow chart of another exemplary method for detecting 3D pseudoscopic images consistent with disclosed embodiments. As shown in FIG. 3, at the beginning, a plurality of 3D video frames (i.e. a 3D image) in a 3D video are selected based on a predetermined rule (S300). Each 3D image may include a first view and a second view. As used in the present disclosure, two views are used to form the 3D image. However, any appropriate number of views may be used.

In particular, the predetermined rule, i.e., the selection of the 3D video frames, may be random but not repeated or may be based on a certain interval, which is only for illustrative purposes and is not intended to limit the scope of the present invention. Further, for one 3D video, a maximum number of detecting 3D pseudoscopic images (indicating maximum times of detecting 3D pseudoscopic images) and a minimum number of detecting 3D pseudoscopic images (indicating minimum times of detecting pseudoscopic) may be determined. For example, the maximum number of detecting 3D pseudoscopic images may be Q, and the minimum number of detecting 3D pseudoscopic images may be P. Q and P are positive integers, respectively.

After the plurality of 3D video frames (i.e. 3D images) are selected, each 3D video frame (i.e. 3D image) may be detected for pseudoscopic images. For a current 3D video frame (i.e. 3D image) having a first view and a second view, as shown in FIG. 3, at the beginning, corresponding feature points in the first view and corresponding feature points in the second view forming the current 3D image are extracted, respectively (S301). Then an average coordinate value of the feature points in the first view and an average coordinate value of the feature points in the second view are calculated respectively (S302). Based on the average coordinate value of the feature points in the first view and the average coordinates value of the feature points in the second view, whether the current 3D image is pseudoscopic or not may be determined (S303). The Steps of S301, S302 and S303 may be similar to those of S101, S102 and S103 in FIG. 1, details of which are not repeated here while certain differences are explained.

The display device may further record S number of detecting 3D pseudoscopic images in the 3D video and corresponding detection results of the multiple 3D video frames (i.e.

3D images). Then, based on the number S and the corresponding detection results of the multiple 3D video frames (i.e., 3D images), the display device may determine whether the 3D video is pseudoscopic or not.

For example, S number of pseudoscopic image detections may be performed in the 3D video, among which N number of 3D video frames (i.e. 3D images) may be determined to be pseudoscopic, M number of 3D video frames (i.e. 3D images) may be determined to be not pseudoscopic and T number of pseudoscopic image detections may be failed. In particular, S=M+N+T, S, M, N and T are positive integers respectively. P denotes the minimum number of detecting 3D pseudoscopic images in the 3D video, P is a positive integer.

If the value of M/S is larger than a predetermined threshold value, the 3D video may not be determined to be pseudoscopic. If the value of N/S is larger than a predetermined threshold value, the 3D video may be determined to be pseudoscopic. The predetermined threshold value may be determined according to requirements of 3D viewing experience. Various requirements may have various threshold values.

For example, according to certain requirements of 3D viewing experience, the predetermined threshold value may be set as approximately 0.7. That is, if a condition of S>=P and (M/S)>0.7 is satisfied, the 3D video may not be determined to be pseudoscopic and the pseudoscopic image detection in the 3D video may end. If the condition of S>=P and (M/S)>0.7 is not satisfied, the pseudoscopic image detection in the 3D video may have to continue.

If a condition of S>=P and (N/S)>0.7 is satisfied, the 3D video may be determined to be pseudoscopic and the pseudoscopic image detection in the 3D video may end. If the condition of S>=P and (N/S)>0.7 is not satisfied, the pseudoscopic image detection in the 3D video may have to continue.

If S>Q, the pseudoscopic image detection in the 3D video may be determined to be failed and the pseudoscopic image detection in the 3D video may end, otherwise the pseudoscopic image detection in the 3D video may have to continue. Q denotes the maximum number of the detecting 3D pseudoscopic images in the 3D video, and P denotes the minimum number of detecting 3D pseudoscopic images in the 3D video. In particular, Q>P, a preferred value of P may be 5 and a preferred value of Q may be 10.

If the 3D video is determined to be pseudoscopic, the pseudoscopic video frames (i.e., pseudoscopic image) in the 3D video may need to be corrected through adjusting the relative order or relative position of the first view and the second view in the pseudoscopic video frames (i.e., pseudoscopic image), respectively.

Through respectively calculating the average coordinate value of the feature points in the first view and the average coordinate value of the feature points in the second view, the display device may be able to determine whether the current 3D image is pseudoscopic or not. Further, based on the results of the pseudoscopic image detection, the display device may determine whether the relative order of the relative position of the first view and the second view forming the current 3D image needs to be changed. Thus, the display device may enable the user to watch 3D images/3D videos with correct depth perceptions, and enhance the viewing experience.

Figure 4:
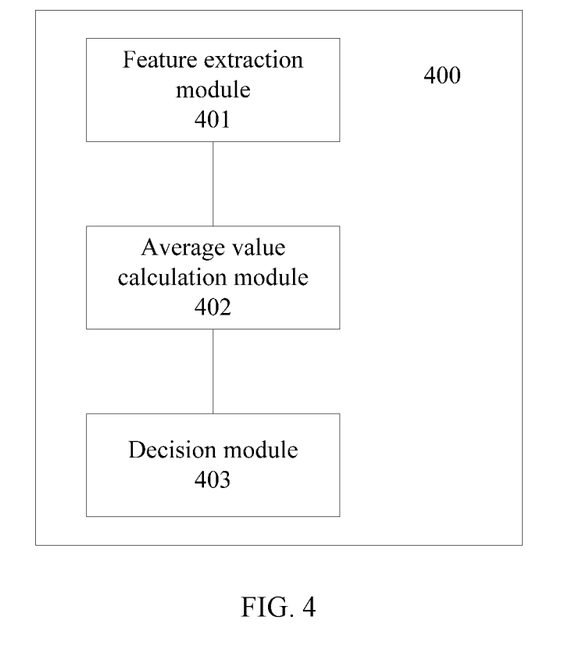
FIG. 4 illustrates a structural schematic diagram of an exemplary display device consistent with disclosed embodiments.

FIG. 4 illustrates a structural schematic diagram of an exemplary display device consistent with disclosed embodiments. The display device 400 may be an electronic device which is capable of capturing 3D images, such as a smartphone, a tablet, and a digital camera, etc., or an electronic device which is capable of playing and/or generating 3D images such as a notebook, a TV, and a smartwatch, etc. (e.g., FIG. 7)

As shown in FIG. 4, the display device 400 may include a feature extraction module 401, an average value calculation module 402 and a decision module 403. All of the modules may be implemented in hardware, software, or a combination of hardware and software. Software programs may be stored in the system memory 508, which may be called and executed by the processor 502 to complete corresponding functions/steps.

The feature extraction module 401 may be configured to extract corresponding feature points in a first view and in a second view, in which the first view and the second view may form a current 3D image. The average value calculation module 402 may be configured to calculate an average coordinate value of the feature points in the first view and an average coordinate value of the feature points in the second view. Based on the average coordinate value of the feature points in the first view and the average coordinates values of the feature points in the second view, the decision module 403 may be configured to determine whether the current 3D image is pseudoscopic or not.

For example, in one embodiment, a left view and a right view may be adopted to form a current 3D image, a first view may be the left view and a second view may be the right view. If an average coordinate value of feature points in the first view is larger than or equal to an average coordinate value of feature points in the second view, the decision module 403 may determine the current 3D image to be pseudoscopic.

In particular, the average coordinate value of the feature points in the first view may be the sum of all X-axis coordinate values of all the feature points in the first view divided by the number of all the feature points in the first view. The average coordinate value of the feature points in the second view may be the sum of all X-axis coordinate values of all the feature points in the second view divided by the number of all the feature points in second first view.

In another embodiment, a left view and a right view may be adopted to form a current 3D image, a first view may be the right view and a second view may be the left view. If an average coordinate value of feature points in the second view is larger than or equal to an average coordinate value of feature points in the first view, the decision module 403 may determine that the current 3D image to be pseudoscopic.

In particular, the average coordinate value of the feature points in the first view may be the sum of all X-axis coordinate values of all the feature points in the first view divided by the number of all the feature points in the first view. The average coordinate value of the feature points in the second view may be the sum of all X-axis coordinate values of all the feature points in the second view divided by the number of all the feature points in second first view.

Figure 6:
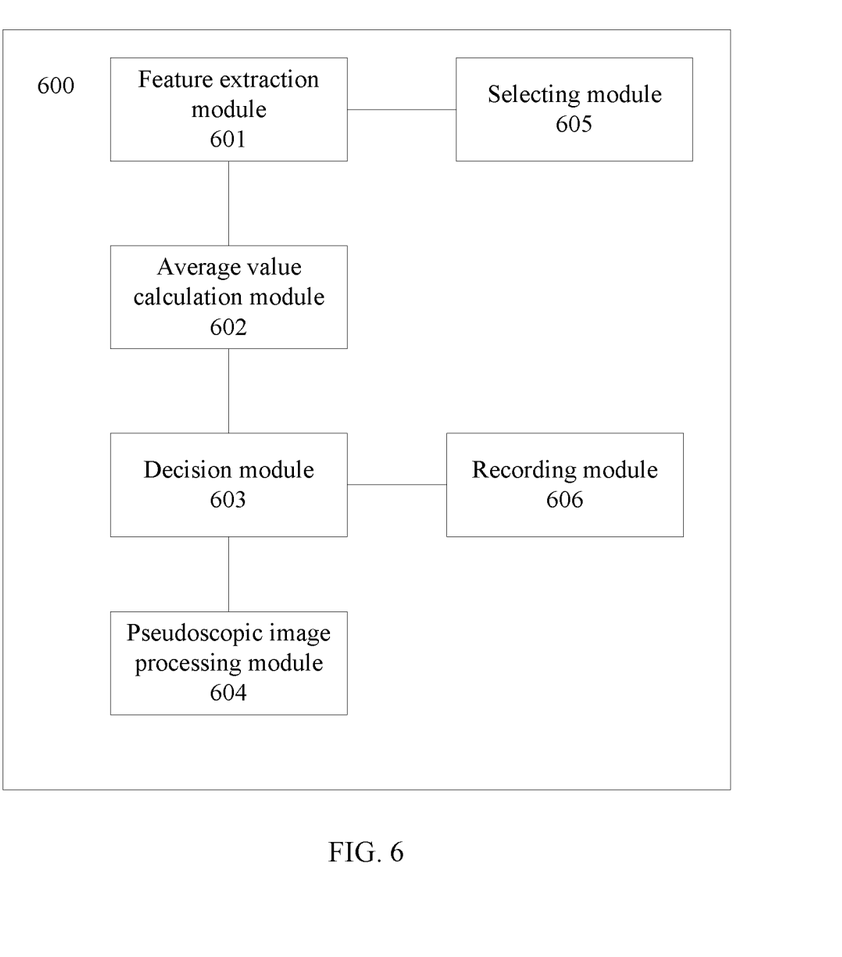
FIG. 6 illustrates a structural schematic diagram of another exemplary display device consistent with disclosed embodiments.

FIG. 6 illustrates a structural schematic diagram of another exemplary display device consistent with disclosed embodiments. As shown in FIG. 6, the display device 600 may include a feature extraction module 601, an average value calculation module 602 and a decision module 603, which may perform similar functions as the modules in FIG. 4. The similarities between FIG. 4 and FIG. 6 are not repeated here, while certain differences are explained.

The display device 600 may further include a pseudoscopic image processing module 604. If the current 3D image is pseudoscopic, the pseudoscopic image processing module may be configured to correct the pseudoscopic image through processing the first view and the second view forming the current 3D image. In particular, the pseudoscopic image processing module may adjust the relative order or relative position of the first view and the second view.

The display device 600 may also include a selecting module 605 configured to select 3D video frames (i.e., 3D images) in a 3D video based on a predetermined rule. Each 3D video frame (i.e., 3D image) may include a first view and a second view.

The display device 600 may also include a recording module 606 configured to record the number of detecting 3D pseudoscopic images in the 3D video (i.e. times of detecting 3D pseudoscopic images in the 3D video) and corresponding detection results of detecting 3D pseudoscopic images in the 3D video. Based on the number of detecting 3D pseudoscopic images in the 3D video and the corresponding detection results of detecting 3D pseudoscopic images in the 3D video, the decision module 603 may determine whether the 3D video is pseudoscopic or not. If the 3D video is determined to be pseudoscopic, the pseudoscopic image processing module may adjust the relative order or relative position of the first view and the second view in the pseudoscopic video frames (i.e. pseudoscopic image) in the 3D video, respectively.

The display device consistent with disclosed embodiments may be an electronic device implemented with various software modules of detecting 3D pseudoscopic images consistent with disclosed embodiments, in which the details of detecting 3D pseudoscopic images may be referred to the previous description of detecting 3D pseudoscopic images. It should be noted that, names of the software modules are only for illustrative purposes, which are not intended to limit the scope of the present invention.

The method for detecting 3D pseudoscopic images may be used in applications such as capturing 3D images and playing 3D videos. For a smartphone or a digital camera capable of capturing 3D images, it usually takes two images of a same scene, in which the two images have a correct relative order and a parallax between them, and then arranges the two images into a 3D image. In addition, a user may upload 2D images and utilize a 3D image creating software to generate corresponding 3D images of the uploaded 2D images. The user may further generate a 3D video based on multiple 3D video frames (i.e., 3D images), which can be played back on a video player.

However, the user may not notice the relative order between the two images forming the 3D image or 3D video frame, and thus may arrange the two images in an incorrect order, resulting an incorrect 3D image. That is, a pseudoscopic image or a pseudoscopic view may be generated and the viewing experience may be affected.

Through respectively calculating the average coordinate value of the feature points in the first view and the average coordinate value of the feature points in the second view, the display device may be able to determine whether the current 3D image is pseudoscopic or not. Further, based on the results of the pseudoscopic image detection, the display device may determine whether the relative order of the relative position of the first view and the second view forming the current 3D image needs to be changed. Thus, the display device may enable the user to watch 3D images/3D videos with correct depth perceptions, and enhance the viewing experience.

Those of skill would further appreciate that the various illustrative modules and algorithm steps disclosed in the embodiments may be implemented as electronic hardware, computer software, or combinations of both. To clearly illustrate this interchangeability of hardware and software, various illustrative modules and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm disclosed in the embodiments may be embodied directly in hardware, in a software module executed by a processor, or in a combination of the two. A software module may reside in RAM, flash memory, ROM, EPROM (erasable programmable read-only memory), EEPROM (electrically erasable programmable read-only memory), registers, hard disk, a removable disk, a CD-ROM, or any other form of storage medium known in the art.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for detecting 3D pseudoscopic images, comprising:

extracting corresponding feature points in a first view and corresponding feature points in a second view, wherein the first view and the second view form a current 3D image;

calculating an average coordinate value of the feature points in the first view and an average coordinate value of the feature points in the second view;

based on the average coordinate value of the feature points in the first view and the average coordinate value of the feature points in the second view, determining whether the current 3D image is pseudoscopic or not, wherein when the first view is a left view and the second view is a right view, determining that the current 3D image is pseudoscopic when the average coordinate value of the feature points in the first view is larger than or equal to the average coordinate value of the feature points in the second view, when the first view is a right view and the second view is a left view, determining that the current 3D image is pseudoscopic when the average coordinate value of the feature points in the second view is larger than or equal to the average coordinate value of the feature points in the first view; and Processing the current 3D image when it is determined that the current 3D image is pseudoscopic.

2. The method for detecting 3D pseudoscopic images according to claim 1, wherein:

the average coordinate value of the feature points in the first view is an average of X-axis coordinate values of the feature points in the first view; and the average coordinate value of the feature points in the second view is an average of X-axis coordinate values of the feature points in the second view.

3. The method for detecting 3D pseudoscopic images according to claim 1, wherein processing the current 3D image further includes:

adjusting the first view and the second view forming the current 3D image when it is determined that the current 3D image is pseudoscopic, such that pseudoscopy in the current 3D image is corrected.

4. The method for detecting 3D pseudoscopic images according to claim 3, wherein adjusting the first view and the second view when the current 3D image is pseudoscopic further includes:

changing a relative order of the first view and the second view forming the current 3D image.

5. The method for detecting 3D pseudoscopic images according to claim 1, further including:

selecting a plurality of 3D video frames from a 3D video based on a predetermined rule, wherein each 3D video frame is a 3D image having a first view and a second view, before extracting corresponding feature points in the first view and corresponding feature points in the second view.

6. The method for detecting 3D pseudoscopic images according to claim 5, further including:

Recording detection results of detecting 3D pseudoscopic images in each of the plurality of 3D video frames; and Recording a number of times of detecting 3D pseudoscopic images in the 3D video.

7. The method for detecting 3D pseudoscopic images according to claim 6, further including:

based on the number of times of detecting 3D pseudoscopic images in the 3D video and the detection results of detecting 3D pseudoscopic images in each of the plurality of 3D video frames, determining whether the 3D video is pseudoscopic or not.

8. The method for detecting 3D pseudoscopic images according to claim 7, further including:

when the 3D video is determined as pseudoscopic, respectively changing a relative order of the first view and the second view in each 3D video frame which is pseudoscopic.

9. A display device for detecting 3D pseudoscopic images, comprising one or more processors, memory, and one or more program modules stored in the memory and to be executed by the one or more processors, the one or more program modules comprising:

a feature extraction module configured to extract corresponding feature points in a first view and corresponding feature points in a second view, wherein the first view and the second view form a current 3D image;

an average value calculation module configured to calculate an average coordinate value of the feature points in the first view and an average coordinate value of the feature points in the second view; and a decision module configured to determine whether the current 3D image is pseudoscopic or not based on the average coordinate value of the feature points in the first view and the average coordinates values of the feature points in the second view, wherein when the first view is a left view and the second view is a right view, the decision module is configured to determine that the current 3D image is pseudoscopic when the average coordinate value of the feature points in the first view is larger than or equal to the average coordinate value of the feature points in the second view, when the first view is a right view and the second view is a left view, the decision module is configured to determine that the current 3D image is pseudoscopic when the average coordinate value of the feature points in the second view is larger than or equal to the average coordinate value of the feature points in the first view.

10. The display device according to claim 9, wherein:

the average coordinate value of the feature points in the first view is an average of X-axis coordinate values of the feature points in the first view; and the average coordinate value of the feature points in the second view is an average of X-axis coordinate values of the feature points in the second view.

11. The display device according to claim 9, further including:

a pseudoscopic image processing module configured to adjust the first view and the second view forming the current 3D image when the decision module determines that the current 3D image is pseudoscopic, such that pseudoscopy in the current 3D image is corrected.

12. The display device according to claim 11, wherein pseudoscopic image processing module is further configured to:

change a relative order of the first view and the second view forming the current 3D image.

13. The display device according to claim 9, further including:

a selecting module configured to select a plurality of 3D video frames from a 3D video based on a predetermined rule, wherein each 3D video frame is a 3D image having a first view and a second view.

14. The display device according to claim 9, further including:

a recording module configured to record a number of times of detecting 3D pseudoscopic images in the 3D video and detection results of detecting 3D pseudoscopic images in each of the plurality of 3D video frames.

15. The display device according to claim 14, wherein the decision module is further configured to:
- based on the number of times of detecting 3D pseudoscopic images in the 3D video and the detection results of detecting 3D pseudoscopic images in each of the plurality of 3D video frames, determine whether the 3D video is pseudoscopic or not.

16. The display device according to claim 15, wherein the pseudoscopic image processing module is further configured to:
- when the decision module determines the 3D video is pseudoscopic, respectively change a relative order of the first view and the second view in each 3D video frame which is pseudoscopic.

\* \* \* \* \*